United States Patent
Larsen

(10) Patent No.: US 7,601,183 B2
(45) Date of Patent: Oct. 13, 2009

(54) METHOD FOR PRODUCING A REVERSIBLE SOLID OXIDE FUEL CELL

(75) Inventor: Peter Halvor Larsen, Roskilde (DK)

(73) Assignee: Technical University of Denmark, Kgs. Lungby (DK)

(*) Notice: Subject to any disclaimer, the term of this patent is extended or adjusted under 35 U.S.C. 154(b) by 0 days.

(21) Appl. No.: 11/814,356

(22) PCT Filed: Feb. 2, 2006

(86) PCT No.: PCT/EP2006/000920

§ 371 (c)(1),
(2), (4) Date: Aug. 23, 2007

(87) PCT Pub. No.: WO2006/082057

PCT Pub. Date: Aug. 10, 2006

(65) Prior Publication Data

US 2008/0118635 A1    May 22, 2008

(30) Foreign Application Priority Data

Feb. 2, 2005 (DK) ................. 2005 00159

(51) Int. Cl.
*H01M 4/82* (2006.01)
*H01M 8/10* (2006.01)
*H01M 8/00* (2006.01)
*B05D 5/12* (2006.01)
*H01G 9/02* (2006.01)

(52) U.S. Cl. .......... 29/623.5; 429/12; 429/30; 429/33; 427/115; 252/62.2

(58) Field of Classification Search ............ 429/12, 429/30, 33; 427/115; 252/62.2; 29/623
See application file for complete search history.

(56) References Cited

U.S. PATENT DOCUMENTS 4,209,147 A    6/1980    Jones, Jr.

(Continued)

FOREIGN PATENT DOCUMENTS

CA    2440288    3/2004

(Continued)

OTHER PUBLICATIONS

Kim J-H et al: "Fabrication and characteristics of anode-supported flat-tube solid oxide fuel cell" Journal of Power Sources, Elsevier, Amsterdam, NL, vol. 122, No. 2, Jul. 23, 2003, pp. 138-143, XP004437055, Issn: 0378-7753, abstract, figures 1-9.

(Continued)

*Primary Examiner*—Patrick Ryan
*Assistant Examiner*—Julian Mercado
(74) *Attorney, Agent, or Firm*—Michael Best & Friedrich LLP

(57) ABSTRACT

The present invention provides a method for producing a reversible solid oxide fuel cell, comprising the steps of: —providing a metallic support layer; —forming a cathode precursor layer on the metallic support layer; —forming an electrolyte layer on the cathode precursor layer; —sintering the obtained multilayer structure; —impregnating the cathode precursor layer so as to form a cathode layer; and— forming an anode layer on top of the electrolyte layer. Furthermore, a reversible SOFC is provided which is obtainable by said method. The method advantageously allows for a greater choice of anode materials, resulting in more freedom in cell design, depending on the desired application.

10 Claims, 1 Drawing Sheet

U.S. PATENT DOCUMENTS

| | | | |
|---|---|---|---|
| 4,702,971 A * | 10/1987 | Isenberg | 429/31 |
| 4,957,673 A | 9/1990 | Schroeder et al. | |
| 5,021,304 A * | 6/1991 | Ruka et al. | 429/30 |
| 5,064,734 A | 11/1991 | Nazmy et al. | |
| 5,358,735 A * | 10/1994 | Kawasaki et al. | 427/115 |
| 5,670,270 A | 9/1997 | Wallin et al. | |
| 5,788,788 A | 8/1998 | Minh | |
| 5,803,934 A | 9/1998 | Carter | |
| 5,846,664 A | 12/1998 | Third et al. | |
| 5,908,713 A | 6/1999 | Ruka et al. | |
| 6,017,647 A | 1/2000 | Wallin | |
| 6,048,636 A | 4/2000 | Naoumidis et al. | |
| 6,099,985 A | 8/2000 | Elangovan et al. | |
| 6,232,009 B1 | 5/2001 | Batawi | |
| 6,248,468 B1 | 6/2001 | Ruka et al. | |
| 6,280,868 B1 | 8/2001 | Badwal et al. | |
| 6,458,170 B1 | 10/2002 | Visco et al. | |
| 6,592,787 B2 | 7/2003 | Pickrell et al. | |
| 6,605,316 B1 | 8/2003 | Visco et al. | |
| 6,682,842 B1 | 1/2004 | Visco et al. | |
| 6,783,880 B2 | 8/2004 | Christiansen | |
| 6,843,960 B2 | 1/2005 | Krumpelt et al. | |
| 6,844,099 B1 | 1/2005 | Gorte et al. | |
| 6,936,217 B2 | 8/2005 | Quadadakkers et al. | |
| 6,958,196 B2 * | 10/2005 | Gorte et al. | 429/44 |
| 7,351,488 B2 * | 4/2008 | Visco et al. | 429/33 |
| 2001/0029231 A1 | 10/2001 | Gorte et al. | |
| 2002/0048699 A1 | 4/2002 | Steele et al. | |
| 2002/0122967 A1 | 9/2002 | Gorina et al. | |
| 2002/0182468 A1 | 12/2002 | Janousek et al. | |
| 2003/0015431 A1 | 1/2003 | Barker et al. | |
| 2003/0035989 A1 | 2/2003 | Gorte et al. | |
| 2003/0059335 A1 | 3/2003 | Quadadakkers et al. | |
| 2003/0059668 A1 | 3/2003 | Visco et al. | |
| 2003/0082434 A1 | 5/2003 | Wang et al. | |
| 2003/0134171 A1 | 7/2003 | Sarkar et al. | |
| 2003/0165726 A1 | 9/2003 | Robert et al. | |
| 2003/0178307 A1 | 9/2003 | Sarkar | |
| 2003/0186101 A1 | 10/2003 | Christansen et al. | |
| 2003/0224234 A1 | 12/2003 | Steele et al. | |
| 2003/0231973 A1 | 12/2003 | Krumpelt et al. | |
| 2003/0232230 A1 | 12/2003 | Carter et al. | |
| 2003/0235752 A1 | 12/2003 | England et al. | |
| 2004/0033405 A1 | 2/2004 | Barnett et al. | |
| 2004/0043269 A1 | 3/2004 | Taniguchi et al. | |
| 2004/0053101 A1 | 3/2004 | Chartier et al. | |
| 2004/0060967 A1 | 4/2004 | Yang et al. | |
| 2004/0115503 A1 | 6/2004 | Jacobson et al. | |
| 2004/0183055 A1 | 9/2004 | Chartier et al. | |
| 2004/0209147 A1 | 10/2004 | Finkenwirth et al. | |
| 2005/0089739 A1 | 4/2005 | Seccombe et al. | |
| 2005/0181253 A1 | 8/2005 | Finnerty et al. | |
| 2006/0024547 A1 | 2/2006 | Waldbillig et al. | |
| 2007/0269701 A1 | 11/2007 | Larsen et al. | |
| 2008/0096079 A1 | 4/2008 | Linderoth et al. | |
| 2008/0124602 A1 | 5/2008 | Larsen et al. | |
| 2008/0142148 A1 | 6/2008 | Nielsen et al. | |
| 2008/0166618 A1 | 7/2008 | Larsen et al. | |

FOREIGN PATENT DOCUMENTS

| | | |
|---|---|---|
| DE | 4237602 | 5/1994 |
| DE | 19650704 | 6/1998 |
| DE | 19710345 | 1/1999 |
| DE | 19836132 | 2/2000 |
| EP | 0446680 | 9/1991 |
| EP | 1065020 | 1/2001 |
| EP | 1255318 | 11/2002 |
| EP | 1306920 | 5/2003 |
| EP | 1318560 | 6/2003 |
| EP | 1383195 | 1/2004 |
| GB | 1313795 | 4/1973 |
| GB | 2400723 | 10/2004 |
| JP | 2004319286 | 11/2004 |
| WO | WO 92/15122 | 9/1992 |
| WO | 98/49738 A1 | 11/1998 |
| WO | WO 99/56899 | 11/1999 |
| WO | WO 02/09116 | 1/2002 |
| WO | WO 02/073729 | 9/2002 |
| WO | WO 03/036739 | 5/2003 |
| WO | WO 03/069705 | 8/2003 |
| WO | WO 03/075382 | 9/2003 |
| WO | WO 03/105252 | 12/2003 |
| WO | WO 2004/001885 | 12/2003 |
| WO | WO 2004/013925 | 2/2004 |
| WO | 2004/030133 A1 | 4/2004 |
| WO | WO 2004/030130 | 4/2004 |
| WO | WO 2004/079033 | 9/2004 |
| WO | WO 2005/122300 | 12/2005 |
| WO | WO 2006/069753 | 7/2006 |
| WO | WO 2006/074932 | 7/2006 |
| WO | WO 2006/079558 | 8/2006 |
| WO | WO 2007/025762 | 3/2007 |

OTHER PUBLICATIONS

Dyck C R et al: "Synthesis and Characterization of GD(1-X)SRXCO(1-Y)FEYO(3-$\delta$) As a Cathode Material for Intermediate Temperature Solid Oxide Fuel Cells" Materials Research Society Symposium Proceedings, Materials Research Society, Pittsburg, PA, US, vol. 801, 2004, pp. 113-118, XP008057502, ISSN: 0272-9172, abstract, figures 1-4.

Donald, I.W. "Preparation, properties and chemistry of glass and glass-ceramic-to-metal seals and coatings," J. Mat. Sci. (1993) 28:2841-2886.

Gut, B. et al., "Anode supported PEN for SOFC. Pressed substrates for spray pyrolysed and co-sintered electrolyte; redox stability and alternative anode," Jahresbericht (2001) 1-6.

Klemensø, T. et al., "The mechanism behind redox instability of anodes in high-temperature SOFCs," Electrochemical Society Journal (2005) 152(11):A2186-A2192.

Matus, Y. et al., "Metal-supported solid oxide fuel cell membranes for rapid thermal cycling," Solid State Ionics (2005) 176:443-449.

Nadler, J.H. et al., "Oxide reduction and sintering of Fe-Cr alloy honeycombs," J. Mat. Research (2003) 18(8):1787-1794.

Xia, C. et al., "Functionally graded cathodes for honeycomb solid oxide fuel cells," Electrochem. Solid-State Letters (2002) 5(10):A217-A220.

Young, R.C. et al., "Symposium BB: Materials and Technologies for a Hydrogen Economy," Materials Research Society Symposium Proceedings Series (Nov. 30, 2003) pp. 709-717.

Zhang, Y. et al., "Redox cycling of Ni-YSZ anode investigated by TPR technique," Solid State Ionics (2005) 176:2193-2199.

International Search Report and Written Opinion from International Searching Authority for PCT/EP2006/000920 dated Sep. 22, 2006 (10 pages).

* cited by examiner

METHOD FOR PRODUCING A REVERSIBLE SOLID OXIDE FUEL CELL

CROSS-REFERENCE TO RELATED APPLICATIONS

This patent application is a national stage filing under 35 U.S.C. 371 of International Application No. PCT/EP2006/000920, filed 2 Feb. 2006, which claims foreign priority to Denmark Patent Application No. PA 2005 00159, filed 2 Feb. 2005, the disclosures of which are incorporated by reference herein in their entireties.

FIELD OF THE INVENTION

The present invention relates to a method for producing a reversible solid oxide fuel cell (SOFC/SOEC) comprising a metallic support, and to a reversible solid oxide fuel cell obtainable by said method.

BACKGROUND ART

Solid oxide fuel cells (SOFCs) operate at high temperatures which are generally in the range of about 750° C. to about 1000° C. These high temperatures are challenging to the materials employed, and are of particular concern with regard to the stability of the anode structures. For fuel oxidation, the so far preferred anode material comprises metallic nickel. Nickel is also preferred for reformed hydrocarbon fuel since it is a good catalyst for hydrocarbon reformation.

Manufacture processes suggested in the prior art include the provision of a support, the formation of an anode layer thereon, followed by the application of an electrolyte layer. The so formed half cell is dried and afterwards sintered, often in a reducing atmosphere. Finally, a cathode layer is formed thereon so as to obtain a complete cell.

However, during the sintering of the half cell, undesired reactions between the metal support and anode materials may occur, resulting in a negative impact on the overall cell performance. Moreover, in the prevalent anode supported design, oxidation of the anode is known to be detrimental for the cell performance. The above mentioned method constitutes some limitations on the anode material to be used.

US 2002/0048699 discloses a solid oxide fuel cell comprising a ferritic stainless steel substrate including a porous region and a non-porous region bounding the porous region. A ferritic stainless steel bipolar plate is located under one surface of the porous region of the substrate and is sealingly attached to the non-porous region of the substrate above the porous region thereof. A first electrode layer is located over the other surface of the porous region of the substrate, an electrolyte layer is located over the first electrode layer and a second electrode layer is located over the electrolyte layer. While such a solid oxide fuel cell is relatively cheap and avoids the use of brittle seals, the SOFC it is not sufficiently robust. The teaching of US 2002/0048699 furthermore does not overcome the above mentioned problems related to the manufacturing process of the SOFC.

WO-A2-2005/122300 relates to a solid oxide fuel cell comprising a metallic support ending in a substantially pure electron conducting oxide, an active anode layer consisting of doped ceria, ScYSZ, Ni—Fe alloy, an electrolyte layer consisting of co-doped zirconia based on an oxygen ionic conductor, an active cathode layer, and a layer of a mixture of LSM and a ferrite as a transition layer to a cathode current collector of a single phase LSM.

WO-A1-2004/030133 discloses a fuel cell supported on the electrode side, comprising a cathode support, a cathode layer, an electrolyte layer and an anode layer in this order. The cathode is preferably applied employing a printing technique.

In view of the prior art, there is still a need for more freedom in choice of suitable materials and design of an SOFC, especially the anode part thereof.

OBJECT OF THE PRESENT INVENTION

It is the object of the present invention to provide a method for producing a reversible solid oxide fuel cell comprising a metallic support, wherein the process allows more freedom in choice of the electrode material, and to provide a reversible SOFC obtainable by said method.

BRIEF DESCRIPTION OF THE INVENTION

Said object is achieved by a method for producing a reversible solid oxide fuel cell, comprising the steps of:
providing a metallic support layer;
forming a cathode precursor layer on the metallic support layer;
forming an electrolyte layer on the cathode precursor layer;
sintering the obtained multilayer structure;
impregnating the cathode precursor layer so as to form a cathode layer; and
forming an anode layer on top of the electrolyte layer.

Said object is further achieved by a method for producing a reversible solid oxide fuel cell, comprising the steps of:
providing a metallic support layer;
forming a cathode precursor layer on the metallic support layer;
forming an electrolyte layer on the cathode precursor layer;
forming an anode precursor layer on the electrolyte layer;
sintering the obtained multilayer structure;
impregnating the cathode precursor layer and the anode precursor layer so as to form a cathode layer and an anode layer.

Said object is finally achieved by a reversible solid oxide fuel cell, obtainable by the above methods.

Preferred embodiments are set forth in the subclaims.

FIGURES

The invention will in the following be explained with reference to the following Figures.

DETAILED DESCRIPTION OF THE INVENTION

Figure 1:
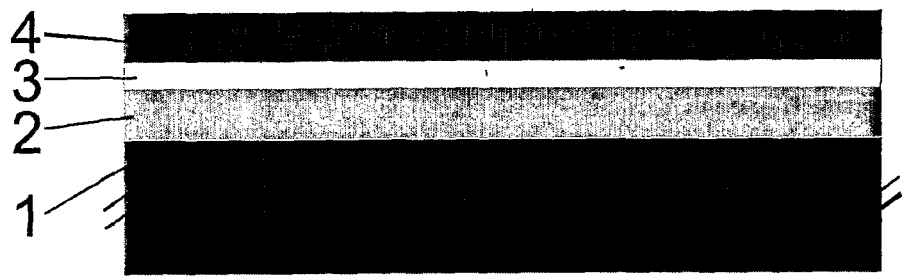
FIG. 1 illustrates a SOFC with a cathode impregnation layer.

In the following, the invention will be described in more detail.

In a first embodiment, the method of the present invention comprises the steps of:
providing a metallic support layer;
forming a cathode precursor layer on the metallic support layer;
forming an electrolyte layer on the cathode precursor layer;
sintering the obtained multilayer structure;
impregnating the cathode precursor layer so as to form a cathode layer; and
forming an anode layer on top of the electrolyte layer.

The metallic support layer is preferably a ferritic stainless steel support. The use of a metallic support makes the cell more robust by increasing the mechanical strength and securing the redox stability. Furthermore, ferritic steels are comparatively cheap and the metallic support allows a cost effective large-scale production of the cell.

In a further preferred embodiment, the metallic support is a porous layer. Porosity of the support may be achieved by adding pore formers during the manufacturing process of the support. The desired porosity can be fine tuned by the amount of pore formers added.

According to the invention, the metallic support may comprise a FeCrMx alloy, wherein Mx is selected from the group consisting of Ni, Ti, Ce, Mn, Mo, W, Co, La, Y, Al, or mixtures thereof. The concentrations of Mx in the alloy are preferably in amounts such that austenite formation is avoided. Preferably, the concentration of Mx is in the range of from about 0 to 15 parts by weight, and more preferably from about 0.1 to 10 parts by weight, based on the total weight of the alloy. Furthermore, the FeCrMx alloy preferably comprises from about 0 to about 50 vol % metal oxides, and more preferred from 0.5 to 30 vol %. Suitable oxides include doped zirconia, doped ceria, Mg/Ca/SrO, $CoO_x$, $MnO_x$, $B_2O_3$, $CuO_x$, $ZnO_2$, $VO_x$, $Cr_2O_3$, $FeO_x$, $MoO_x$, $WO_3$, $Ga_2O_3$, $Al_2O_3$, $TiO_2$, and mixtures thereof. The addition of one or more of said oxides enhances the chemical bonding between the electrode layer and the metal support, at the same time advantageously adjusting the thermal expansion coefficient of the respective layers so as to reduce the TEC difference thereof. Also, said oxides may be used to control the sinterability and grain growth of the layer. In the case of, for example, Mg/Ca/SrO, or $CoO_x$, the TEC difference will increase, whereas in case of, for example, $Cr_2O_3$, $Al_2O_3$, $TiO_2$, zirconia and possibly ceria, the TEC will be reduced. Thus, the addition of the respective oxide can be used to design the TEC difference as desired.

In a further preferred embodiment, the FeCrMx porous support layer comprises an oxide layer on all internal and external surfaces. Said oxide layer may be formed by oxidation of the FeCrMx alloy itself in a suitable atmosphere. Alternatively, the oxide layer may be coated on the alloy. The oxide layer advantageously inhibits the corrosion of the metal. Suitable oxide layers comprise, for example, $Cr_2O_3$, $CeO_2$, $LaCrO_3$, $SrTiO_3$, and mixtures thereof. The oxide layer may preferably furthermore be suitably doped, e.g. by alkaline earth oxides.

The thickness of the metallic support layer of the present invention is preferably in the range of about 200 to about 2000 μm, and more preferably of about 250 to about 1000 μm.

The electrode precursor layers are preferably formed from doped zirconia and/or doped ceria and/or a FeCrMx alloy, and in the case of a cathode precursor layer a material selected from the group consisting of lanthanum strontium manganate, lanthanide strontium manganate, lanthanide strontium iron cobalt oxide, $(Y_{1-x}Ca_x)Fe_{1-y}Co_yO_3$ $(Gd_{1-x}Sr_x)Fe_{1-y}Co_yO_3$, $(Gd_{1-x}Ca_x)Fe_{1-y}Co_yO_3$, and mixtures thereof, may optionally be added. More preferred is the precursor layer being formed from Sc—Y—Ga—Ce, zirconia doped with any of Sm, Gd, Y, any Ln element, CaO doped ceria, and mixtures thereof, and optionally a material as defined above. Also optionally, metals and metal alloys such as FeCrMx, Ni, NiCrMx, and the like, may be added, with Mx being selected from the group consisting of Ni, Ti, Ce, Mn, Mo, W, Co, La, Y, Al, and mixtures thereof. In case of addition of the metals or metal alloys, the layer will possess oxygen-ion conductivity due to the layer comprising doped zirconia/ceria, as well as electronic conductivity due to the metal. If the layer comprises doped ceria, the layer will also exhibit some electrocatalytic properties.

The electrode precursor layers are converted to the respective electrode layers by impregnation after sintering. If the precursor layer is converted into an anode, impregnation is conducted with, for example, Ni with or without doped ceria. Preferably, the impregnation of the anode precursor layer is carried out with a solution comprising a nitrates of Ni, Ce and Gd. If the precursor layer is converted into a cathode layer, the impregnation is preferably carried out with ferrites or cobaltites.

According to the invention, the final cathode layer preferably comprises a composite material comprising doped zirconia and/or doped ceria and/or a FeCrMx alloy, for example scandia and yttria stabilized zirconia (ScYSZ), and further a material selected from the group consisting of lanthanum strontium manganate (LSM), lanthanide strontium manganate (LnSrMn), lanthanide strontium iron cobalt oxide (LnSrFeCo), $(Y_{1-x}Ca_x)Fe_{1-y}Co_yO_3$, $(Gd_{1-x}Sr_x)_sFe_{1-y}Co_yO_3$ or $(Gd_{1-x}Ca_x)_sFe_{1-y}Co_yO_3$ and mixtures thereof. It has been found that a cathode layer comprising said composite material exhibits a better cathode performance, as compared to other cathode materials known in the art.

The thickness of the cathode layer is preferably in the range of about 10 to about 100 μm, and more preferably of about 15 to about 40 μm.

In a further preferred embodiment, the cathode precursor layer may be a graded impregnation layer which is made from one or more of thin sheets comprising a mixture of electrolyte material and a metal alloy, such as the ones mentioned above. Each sheet may have varying grain sizes and pore sizes, and a thicknesses of about 10 to 50 μm. The gradiation is achieved by, for example, laminating the metal support layer and various sheets, preferably 1 to 4 sheets, with different grain sizes and pore sizes by rolling or pressing. The resulting graded layer may, for example, have an average grain size ranging from about 5 to 10 μm in the sheet closest to the metal support layer, and about 1 μm in the sheet closest to the electrolyte layer.

The electrolyte layer preferably comprises doped zirconia or doped ceria. In a more preferred embodiment, the electrolyte layer comprises a co-doped zirconia based oxygen ionic conductor. Said electrolyte layer has a higher oxygen ionic conductivity than a layer comprising pure YSZ, and a better long time stability than a layer comprising pure ScSZ. Doped ceria may be used alternatively. Other suitable materials for the formation of the electrolyte layer include ionic conducting materials mentioned above for the electrode precursor layers, and also gallates and proton conducting electrolytes.

The thickness of the electrolyte layer of the present invention is preferably in the range of about 5 to about 50 μm, and more preferably of about 10 to about 25 μm.

In another preferred embodiment, the anode layer is directly formed on the sintered multilayer structure comprising the metallic support layer, the cathode layer and the electrolyte layer. Said anode layer is a porous layer comprising NiO and doped zirconia or doped ceria.

Alternatively, a redox stable anode may be deposited on the multilayer structure. The anode material of the redox stable anode comprises Ni-zirconia, Ni-ceria, or any other metal oxide with oxygen ion or proton conductivity, for example, $La(Sr)Ga(Mg)O_{3-\delta}$, $SrCe(Yb)O_{3-\delta}$, $BaZr(Y)O_{3-\delta}$, or the like, which have the property of being able to withstand redox cycling better than hitherto known anodes.

Surface passivation of Ni-surfaces of the redox stable anode is achieved by the composition comprising at least one additional oxide that is stable both under SOFC anode and cathode conditions, e.g. $Al_2O_3$, $TiO_2$, $Cr_2O_3$, $Sc_2O_3$, $VO_x$, $TaO_x$, $MnO_x$, $NbO_x$, CaO, $Bi_2O_3$, $LnO_x$, $MgCr_2O_4$, $MgTiO_3$, $CaAl_2O_4$, $LaAlO_3$, $YbCrO_3$, $ErCrO_4$, $NiTiO_3$, $NiCr_2O_4$, and mixtures thereof. Preferred are $TiO_2$ and $Cr_2O_3$.

If, for example, $TiO_2$ or $Cr_2O_3$ is used, $NiTi_2O_4$ and $NiCr_2O_4$ are formed in the redox stable anode layer during the sintering step. A redox stable microstructure is created during the initial reduction of the anode composition, leaving a percolating Ni structure with randomly distributed fine $TiO_2$ particles (on average about 1 micrometer).

The addition of the oxides furthermore preferably results in a decrease of the thermal extension coefficient of the redox stable anode layer, which in turn strengthens the overall mechanical stability of the layers and the resulting cell. Preferred oxides therefore are $Cr_2O_3$, $TiO_2$, $Al_2O_3$, and $Sc_2O_3$.

The amount of NiO in the composition is preferably in the range of about 45 to 75 weight %, based on the total weight of the composition, and more preferred in the range of from about 50 to 65 wt %. The amount of doped zirconia, doped ceria and/or a metal oxide with an oxygen ion or proton conductivity in the composition is preferably in the range of about 25 to 55 weight %, based on the total weight of the composition, and more preferably in the range of from 40 to 45 wt %. As a preferred material, $Zr_{1-x}M_xO_{2-\delta}$ may be used, with M=Sc, Ce, Ga, or combinations thereof. Y may also be included. X is in the range of about 0.05 to about 0.3. Also preferred is $Ce_{1-x}M_xO_{2-\delta}$ with M=Ca, Sm, Gd, Y and/or any Ln element, or combinations thereof. X is in the range of about 0.05 to about 0.3.

The amount of the at least one oxide in the composition is preferably in the range of about 1 to 25 weight %, based on the total weight of the composition, and more preferably in the range of from about 2 to 10 wt %.

In a further preferred embodiment, the composition additionally comprises an oxide selected from the group consisting of $Al_2O_3$, $Co_3O_4$, $Mn_3O_4$, $B_2O_3$, CuO, ZnO, $Fe_3O_4$, $MoO_3$, $WO_3$, $Ga_2O_3$, and mixtures thereof. The amount thereof in the composition is preferably in the range of about 0.1 to 5 weight %, based on the total weight of the composition, and more preferred in the range of from 0.2 to 2 wt %. The additional oxides are used as sintering aids to facilitate the reaction during the sintering step.

Other suitable materials for the metallic support layer, the electrode precursor layer, the electrolyte layer, and the anode and cathode layer may be selected form the materials disclosed in "An improved solid oxide fuel cell", Danish patent application No PA 2004 00904.

The individual layers may be tape cast and subsequently laminated together. Alternatively, the individual layers may, for example, be rolled from a paste or the like. Other application methods of the respective layers include spraying, spray-painting, screen-printing; electrophoretic deposition (EPD), and pulsed laser deposition (PLD).

The sintering temperatures are preferably in the range of from about 900 to 1500° C., more preferably in the range of from about 1000 to 1300° C.

In a second embodiment of the present invention, a method for producing a reversible solid oxide fuel cell is provided, comprising the steps of:
  providing a metallic support layer;
  forming a cathode precursor layer on the metallic support layer;
  forming an electrolyte layer on the cathode precursor layer;
  forming an anode precursor layer on the electrolyte layer;
  sintering the obtained multilayer structure;
  impregnating the cathode precursor layer and the anode precursor layer so as to form a cathode layer and an anode layer.

In this embodiment, the anode precursor layer is formed on the electrolyte layer prior to sintering. Thereby, a second sintering step may be omitted. After sintering, the respective electrode layers are impregnated, as described further above. The layer not to be impregnated in the respective impregnation step is masked so as to allow different impregnation materials. After impregnating the first layer, said impregnated layer is masked, the other layer is demasked so as to be impregnated, and impregnating the second layer.

All other preferred embodiments described for the first embodiment of the method of the present invention also apply to the second embodiment of the method of the present invention.

The method may preferably include the step of providing a reaction barrier layer comprising doped ceria. Said reaction barrier layer, if provided, is located between the electrolyte layer and the cathode layer. The thickness of the barrier layer is about 0.1 to about 1 µm. The barrier layer advantageously prevents diffusion of cations from the cathode layer into the electrolyte layer, thereby increasing the life time of the cathode layer.

Referring now to FIG. 1, a cell in accordance with the present invention is illustrated comprising a metallic support 1, a precursor layer for impregnation of the cathode 2, an electrolyte layer 3, and an anode layer 4.

Figure 2:
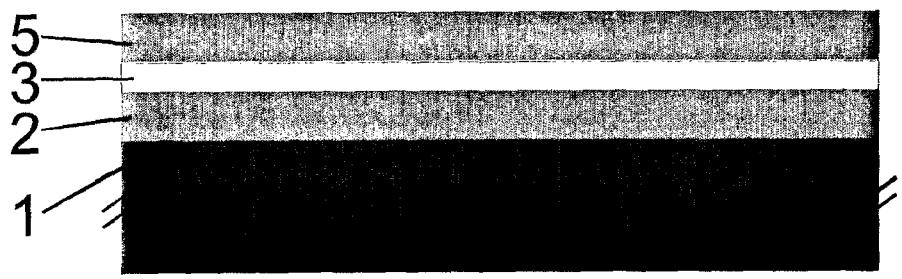
FIG. 2 illustrates a SOFC with a double electrode impregnation layer.

The cell illustrated in FIG. 2 corresponds to the one of FIG. 1 with the exception of an anode precursor layer 5.

Figure 3:
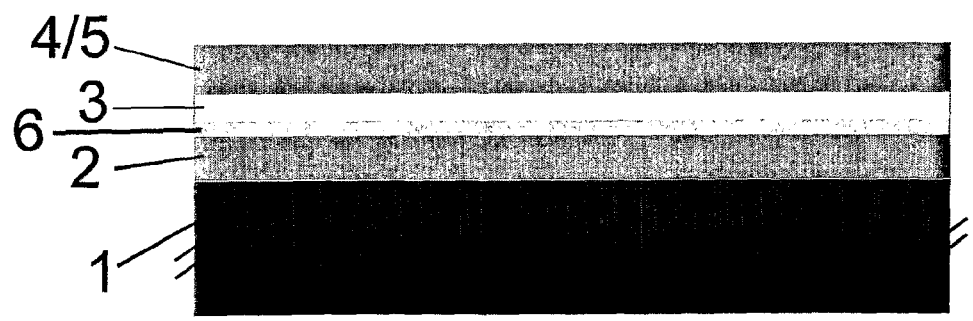
FIG. 3 illustrates a SOFC with a cathode impregnation layer and a barrier layer.

Referring to FIG. 3, a cell is illustrated comprising a metallic support 1, a precursor layer for impregnation of the cathode 2, an electrolyte layer 3, an anode layer 4/5 and a barrier layer 6.

The present invention also provides a reversible solid oxide fuel cell, obtainable by the above described methods. Advantageously, the impregnation allows more freedom in design and material selection of the SOFC, thus allowing to fine tune the SOFC design according to the desired application. Furthermore, the impregnation of the electrode layers results in finely distributed catalyst particles on the surface of the pores, which in turn leads to an improved cell performance. The particles are preferably in the size range of nanoparticles, making the electrode performances even more effective. Moreover, less catalytic material is needed since all material is applied to the surface of the layer structure, where it can contribute to the electrode reaction.

The present invention provides the following advantages:
a) The method is less complicated than methods suggested in the prior art, since no cathode/metal support barrier layer is required;
b) The life time of the metallic support will be increased; during operation of SOFCs having the anode on the metallic support, the relatively high $pH_2O$ (>0.5 atm.) on the anode side may result in severe corrosion of the metal support. Having the cathode on the support side, the metal will only be exposed to air, which is less corrosive;
c) If the anode and cathode are impregnated after sintering, only one sintering step is required and the method can thus be made more cost effective;
d) The sintering step may be carried out without the presence of anode or cathode materials, hence negative reactions, such as coarsening, during sintering is not an issue;
e) Chemical reaction between electrode materials and the other cell materials can be prevented because the operational temperature of the final cell is lower than the sintering temperature;

f) Due to impregnation of the electrodes, the electrodes have high surface areas;
g) The composite structure of the impregnation layer(s) ensures a good mechanical bonding between electrolyte and metal support as well as good conductivity across the interfaces.

In the following, the invention will be illustrated by examples. Alternative embodiments and examples exist without departing from the scope of the present invention.

EXAMPLES

Example 1

Preparation of a Reversible SOFC with Porous Cathode Impregnation Layer

A metallic support layer was tape-cast from a powder suspension comprising a Fe22Cr alloy, followed by a drying step. The support layer had a thickness of 300 µm. Thereon, a porous layer comprising $Zr_{0.78}Sc_{0.20}Y_{0.02}O_{2-\delta}$ for later impregnation of the cathode was formed by spray painting. The layer had a thickness of 50 µm and a porosity of about 40% with an average pore size of about 1-3 µm. Then, an electrolyte layer comprising $Zr_{0.78}Sc_{0.20}Y_{0.02}O_{2-\delta}$ was formed thereon, also by spray painting. The electrolyte layer was formed from doped zirconia and had a thickness of about 10 µm.

The obtained multi-layer structure was dried, followed by sintering under reducing conditions at about 1300° C.

After sintering a nitrate solution of $(Gd_{0.1}Ce_{0.9})O_{2-\delta}$ and $(La_{0.6}Sr_{0.4})_{0.98}(Cu_{0.2}Fe_{0.8})O_{3-\delta}$ was impregnated in to the cathode precursor layer by vacuum infiltration. The nitrates were subsequently decomposed at 500° C. for 2 hours. The impregnation procedure was repeated 5 times.

Afterwards, an $NiO$—$(Gd_{0.01}Ce_{0.9})O_{2-\delta}$ anode was spray deposited on the surface of the multilayer structure. The resulting anode had a volume concentration of about 45% Ni and 55% $(Gd_{0.1}Ce_{0.9})O_{2-\delta}$.

Example 2

A metallic support layer was tape-cast from a powder suspension comprising a FeCrMn0.01 alloy, followed by a drying step. The support layer had a thickness of 400 µm.

After drying of the support layer, a layer for later electrode impregnation (layer 2, 50 micrometer) was deposited by screen-printing an ink comprising a 1:1 volume mixture of $Zr_{0.78}Sc_{0.20}Y_{0.02}Zr_{2-\delta}$ and a Fe24CrMn0.01 The layer had a thickness of 50 µm. Finally an electrolyte layer comprising $Zr_{0.78}Sc_{0.20}Y_{0.02}O_{2-\delta}$ was deposited by spray painting.

The multilayer structure was sintered and the cathode impregnated as described in Example 1.

After sintering a redox stable anode was deposited by spray painting a suspension of $NiO$—$Zr_{0.78}Sc_{0.20}Y_{0.02}Zr_{2-\delta}$—$TiO_2$. (52:43:5 weight %, respectively), followed by an additional sintering step at about 1000° C. in air. During sintering of the anode, $NiTi_2O_4$ was formed in the anode structure. The redox stable microstructure was created during the initial reduction of the anode, leaving a percolating Ni structure with randomly distributed fine $TiO_2$ particles (~1 µm).

Example 3

Same method as in Example 2, but with the composition for the redox stable anode comprising pre-reacted $NiTiO_3$ before processing.

Example 4

Same method as in Example 2, but with the composition for the redox stable anode comprising $NiCr_2O_4$ before processing.

Example 5

Same method as in Example 2, but with the composition for the redox stable anode comprising a mixture of pre-reacted $NiTiO_3$ and $NiCr_2O_4$ to control the coverage of the nickel surfaces.

Example 6

Same method as in Example 2, but with the composition for the redox stable anode comprising $Sc_2O_3$ as the added oxide.

Example 7

Same method as in Example 2, but with the composition for the redox stable anode comprising $NiTiO_3$ along with an equal molar amount of $SrZrO_3$. During sintering, the following reaction took place. $NiTiO_3+(SrLa)ZrO_3=NiO+(SrLa)TiO_3+ZrO_2$.

Example 8

Same method as in Example 2, but with the composition for the redox stable anode comprising doped ceria instead of zirconia.

Example 9

Same as Example 1, wherein the support sheet was obtained by tape-casting a Fe22CrTi0.04 alloy powder suspension mixed with 5 vol % $Zr_{0.94}Y_{0.06}Zr_{2-\delta}$.

The cell was completed as described in Example 2.

Example 10

A metallic support layer was tape-cast from a powder suspension comprising a Fe22Cr alloy, followed by a drying step. The support layer had a thickness of 400 µm.

A graded impregnation precursor layer was formed thereon from three thin sheets comprising $Zr_{0.78}Sc_{0.20}Y_{0.02}Zr_{2-\delta}$ and a Fe22Cr alloy. The sheets with varying grain sizes and varying pore sizes, having a thicknesses of about 20 µm were manufactured by tape-casting respective powder suspensions. The cell structure was made by laminating the metal support sheet and the three impregnation precursor layers sheets by rolling and pressing. The obtained impregnation layer had a graded structure with pore size of from 10 µm in the layer directly on top of the metal support layer, and a pore size of 2 µm at the layer on which the electrolyte layer was formed.

The cell was completed as described in Example 1.

Example 11

As Example 1, but with the addition of $Al_2O_3$ as a sintering additive so as to control the shrinkage.

The cell was completed as described in Example 1.

Example 12

A half-cell as described in Example 1 was manufactured, wherein additionally a $Gd_{0.1}Ce_{0.9}O_{2-\delta}$ cathode/electrolyte barrier layer having a thickness of 0.5 µm was applied.

The cell was completed as described in Example 1.

Example 13

A metallic support layer was formed by rolling a Fe22CrNd0.02Ti0.03 alloy paste, followed by a drying step. The support layer had a thickness of 800 μm.

A layer for cathode impregnation having a thickness of 30 μm, and an electrolyte layer having a thickness of 10 μm were deposited by spray painting. Both layers were formed from a composition of $(Gd_{0.1}Ce_{0.9})O_{2-\delta}$. After sintering, a nitrate solution of Ni, La, Sr, Co and Fe was impregnated into the porous ceria layer by vacuum infiltration. After drying and cleaning of the electrolyte surface, a NiO—$(Sm_{0.1}Ce_{0.9})O_{2-\delta}$ anode was deposited by screen printing.

Example 14

A support was manufactured as explained in Example 1. After drying of the support, a layer for cathode impregnation, having a thickness of 70 μm, a $Zr_{0.78}Sc_{0.20}Y_{0.02}O_{2-\delta}$ electrolyte layer having a thickness of 10 μm, and finally another layer for anode impregnation having a thickness of 30 μm, were deposited by spray painting. Both impregnation layers were formed from a composition of $Zr_{0.78}Sc_{0.20}Y_{0.02}O_{2-\delta}$ and 40 vol % Fe22Cr powder with an approximate porosity of ~40%.

Samples were subsequently punched out in the desired dimensions, and the samples were sintered under controlled reducing conditions. The metal support layer was masked, and a solution of Ni-, Ce-, Gd-nitrates was impregnated into the anode impregnation precursor layer by vacuum infiltration. The resulting anode will had a volume concentration of 40% Ni and 60% $(Gd_{0.1}Ce_{0.9})O_{2-\delta}$. After drying, the mask was removed, the anode layer masked and a nitrate solution used to impregnate the cathode precursor layer by vacuum infiltration so that the resulting cathode composition was $(Gd_{0.6}Sr_{0.4})_{0.99}(Cu_{0.2}Fe_{0.8})O_{3-\delta}$.

Example 15

A cell structure was manufactured as described in Example 1. The cathode layer was formed by pressure impregnation of a nano-sized suspension of $(La_{0.6}Sr_{0.4})_{0.99}(Co_{0.2}Fe_{0.8})O_{3-\delta}$.

The invention claimed is:

1. A method for producing a reversible solid oxide fuel cell, comprising the steps of:
   (a) forming a multilayer structure by
      (i) forming a cathode precursor layer on a metallic support layer; and
      (ii) forming an electrolyte layer on the cathode precursor layer;
   (b) sintering the multilayer structure;
   (c) impregnating the cathode precursor layer in the sintered multilayer structure of step (b) so as to form a cathode layer; and
   (d) forming an anode layer on top of the electrolyte layer.

2. The method of claim 1, wherein the anode is formed by impregnation of an anode precursor layer.

3. The method of claim 2, wherein the impregnation of the anode precursor layer is carried out with a solution comprising a nitrate selected from Ni, Ce and Gd nitrates, and mixtures thereof.

4. The method of claim 1, wherein the metallic support layer comprises a FeCrMx alloy, wherein Mx is selected from the group consisting of Ni, Ti, Ce, Mn, Mo, W, Co, La, Y, Al, or mixtures thereof, and from about 0 to about 50 vol % metal oxides.

5. The method of claim 4, wherein the metal oxide is selected from the group of doped zirconia, doped ceria, Mg/Ca/SrO, $CoO_x$, $MnO_x$, $B_2O_3$, $CuO_x$, $ZnO_2$, $VO_x$, $Cr_2O_3$, $FeO_x$, $MoO_x$, $WO_3$, $Ga_2O_3$, $Al_2O_3$, $TiO_2$, and mixtures thereof.

6. The method of claim 1, wherein the cathode layer comprises doped zirconia, doped ceria, a FeCrMx alloy, or a combination thereof, and further at least one material selected from the group consisting of lanthanum strontium manganate, lanthanide strontium manganate, lanthanide strontium iron cobalt oxide, $(Y_{1-x}Ca_x)Fe_{1-y}Co_yO_3$, $(Gd_{1-x}Sr_x)Fe_{1-y}Co_yO_3$, $(Gd_{1-x}Ca_x)Fe_{1-y}Co_yO_3$, and mixtures thereof.

7. The method of claim 1, wherein the electrolyte layer comprises doped zirconia or doped ceria.

8. The method of claim 1, wherein the formed anode layer is a redox stable anode.

9. The method of claim 1, wherein the metallic support layer comprises an oxide layer on the surface thereof.

10. A method for producing a reversible solid oxide fuel cell, comprising the steps of:
    (a) forming a multilayer structure by
       (i) forming a cathode precursor layer on a metallic support layer;
       (ii) forming an electrolyte layer on the cathode precursor layer; and
       (iii) forming an anode precursor layer on the electrolyte layer;
    (b) sintering the multilayer structure;
    (c) impregnating the cathode precursor layer and the anode precursor layer in the sintered multilayer structure of step (b) so as to form a cathode layer and an anode layer.

* * * * *